United States Patent [19]
Turkdogan et al.

[11] 3,839,013

[45] Oct. 1, 1974

[54] COPPER RECOVERY FROM LEAN SULFIDE ORES

[75] Inventors: Ethem T. Turkdogan, Pittsburgh; Benjamin B. Rice, Penn Hills Township, Allegheny County, both of Pa.

[73] Assignee: United States Steel Corporation, Pittsburgh, Pa.

[22] Filed: June 18, 1973

[21] Appl. No.: 371,215

[52] U.S. Cl............................ 75/1, 75/115, 423/557
[51] Int. Cl............................................... C22b 1/06
[58] Field of Search ................... 75/1, 115; 423/557

[56] References Cited
UNITED STATES PATENTS
1,995,555  3/1935  Weidmann........................... 423/557
3,057,716  10/1962  Kruse................................ 75/115 X
3,403,995  10/1968  Fekete et al. ......................... 75/115

FOREIGN PATENTS OR APPLICATIONS
22,746  4/1930  Australia............................... 75/115

OTHER PUBLICATIONS
F. E. Joyce, Sr., "Sulfatization of Nickelferous Laterites," U.S. Dept. Interior, Bureau of Mines [1965] RI 6644.

*Primary Examiner*—A. B. Curtis
*Attorney, Agent, or Firm*—William L. Krayer

[57] ABSTRACT

Copper is recovered from ores containing about 10–15 percent copper in the form of a sulfide in the presence of significant amounts of iron and nickel, by sulfatizing roasting the ore in an atmosphere including 5–15 percent $SO_2$ at a temperature of from about 580°C to about 625°C and leaching soluble copper salt therefrom with water.

8 Claims, 5 Drawing Figures

COPPER RECOVERY FROM LEAN SULFIDE ORES

BACKGROUND OF THE INVENTION

Although roasting of sulfide deposits is an old process, which is used primarily in the extraction of nonferrous metals, it is only in recent years that some consideration has been given to the study of specific chemical reactions during roasting. A critical review of sulfation equilibria by Kellogg (H. H. Kellogg, Trans. Met. Soc. AIME, 1964, vol. 230, pp. 1,622–34) contains information on reaction equilibria useful in the study of sulfatizing roasting. During roasting several oxidation reactions occur, yielding metal oxides, sulfates, oxysulfates and $SO_2$. Whether or not sulfates are formed depends on tempertaure, $O_2$ and $SO_2$ partial pressures in the roasting bed. The $P_{SO_2}$ vs $P_{O_2}$ relations for sulfate/oxide equilibria, determined by Ingraham (T. R. Ingraham, Trans. Met. Soc. AIME, 1965, vol. 233, pp. 359–63; "Application of Fundamental Thermosynamics to Metallurgical Processes," edit. G. R. Fitterer, Gordon and Breach Sci. Pub., 1967, pp. 179–96) are shown in FIGS. 1 and 2 for 500° and 700°C respectively. The line for $ZnSO_4$–$Zn_3SO_6$ equilibrium (not shown in FIGS. 1 and 2) is between those for $CuSO_4$–$Cu_2SO_5$ and $NiSO_4$–$NiO$ lines, and that for the $CoSO_4$–$CoO$ equilibrium is slightly below the $NiSO_4$ line.

According to the pilot plant work reported by Stephens (Chem. Eng. Prog., 1953, vol. 49, No. 9, pp. 455–58) over 90 percent of the copper is recovered as water soluble sulfate by the sulfatizing roasting of high copper sulfide ores; that is usually referred to as the Outokumpy process (M. Palperi and O. Aaltonen, J. Metals, 1971, vol. 23, pp. 34–38) for sulfatizing and water leaching sulfide concentrates containing iron, copper, nickel, zinc and cobalt.

The reader may be interested in Foley U.S. Pat. No. 2,783,141 and Bryk et al U.S. Pat. No. 3,681,046, which show the treatment of copper-containing sulfidic ores by roasting and leaching. These specifications, however, fail to introduce $SO_2$ from outside the process and accordingly fail to appreciate the role of the $O_2$/$SO_2$ balance which we have applied. See also Bryk U.S. Pat. No. 3,460,491 which relates to the Outokumpu Oy process mentioned above. In addition, the reader may be interested in U.S. Pat. Nos. 3,351,462, 3,544,306, 3,573,896, 3,647,368, 3,146,091 and 3,582,317.

SUMMARY OF THE INVENTION

The present invention may be considered as a modification of the Outokumpu process. The concentrate is roasted in a fluidized bed at 580° to 625°C with a mixture of air and $SO_2$ preferably at a ratio of 90 percent/10 percent, and then water leached. The $SO_2$ content may vary from 5–15 percent. With concentrate containing 8 percent to 13 percent Cu and 1 percent to 2 percent Ni, about 50 percent of the copper is recovered as copper sulfate in the water leach. Upon second stage roasting of the residue, followed by water leach, the copper recovery is above 85 percent. After a third similar treatment over 95 percent of the copper is recovered as copper sulfate.

Another important outcome of the present finding is that after water leach, the solution contains primarily copper sulfate with relatively smaller proportions of iron and nickel sulfates. For example, at the third stage of roast-water leach, the solution contains as sulfates, about 80 percent copper, 15 percent iron and 5 percent nickel. The Cu/Fe ratio in the solution is within 5 to 6 while it is 0.5 to 0.6 in the concentrate; the Cu/Ni ratio in the solution is about 16 while it is about 6 in the concentrate. The copper can readily be extracted from this solution by conventional electrolysis; iron and nickel can also be recovered with the production of sulfuric acid as a by-product.

The nickel and iron contents (as oxides) in the residue after the third stage of roast-water leach are, respectively, 80 percent and 85 percent of those in the original concentrate (as sulfides). This residue, which contains about 1 percent S, is amenable to further treatment for the recovery of nickel by an appropriate process.

Our invention further differs from the Outokumpu Oy process in that the ores we employ are considerably leaner than those used at Outokumpu.

Reference will be made to the accompanying drawings, in which.

Figure 4:
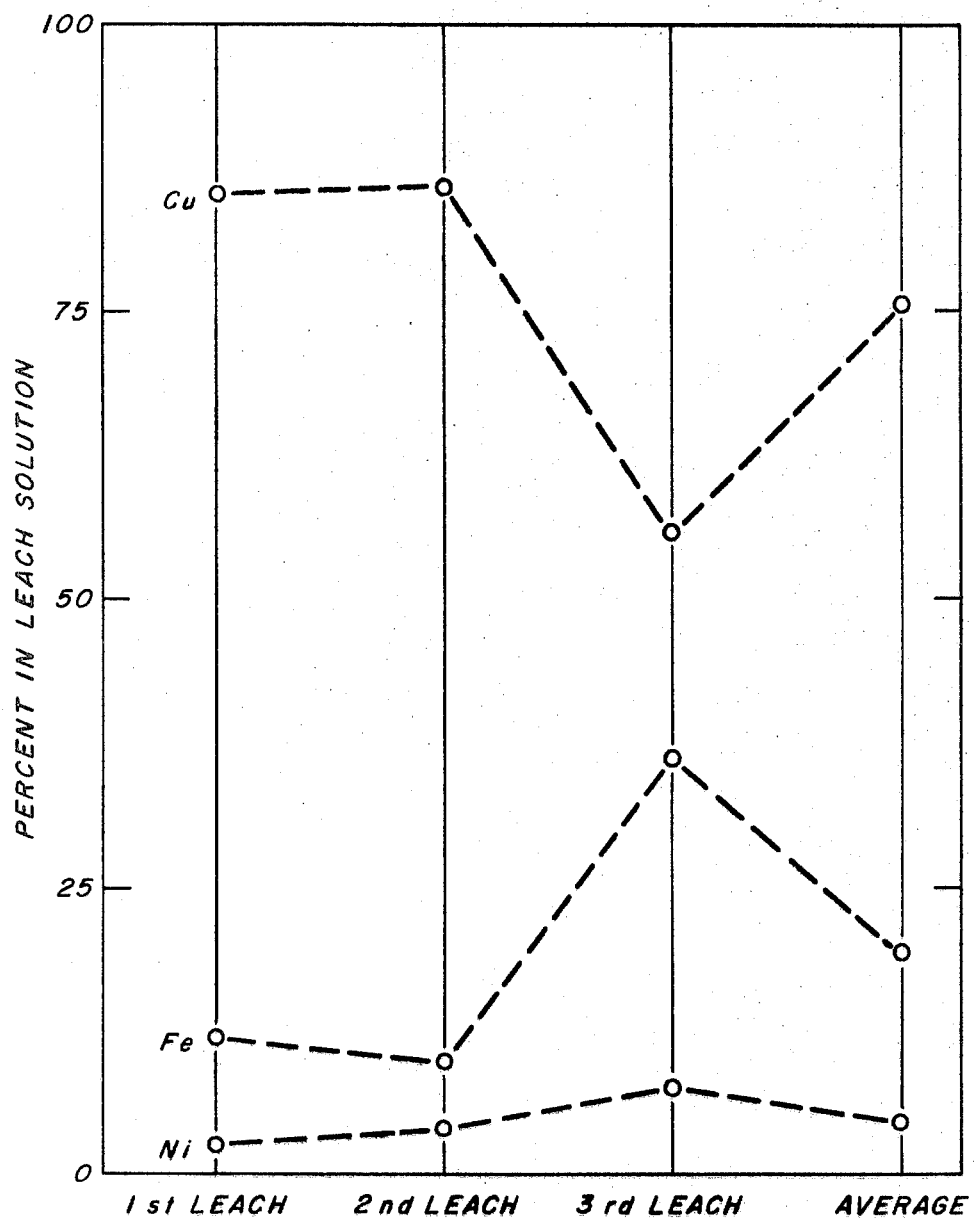
Figure 5:
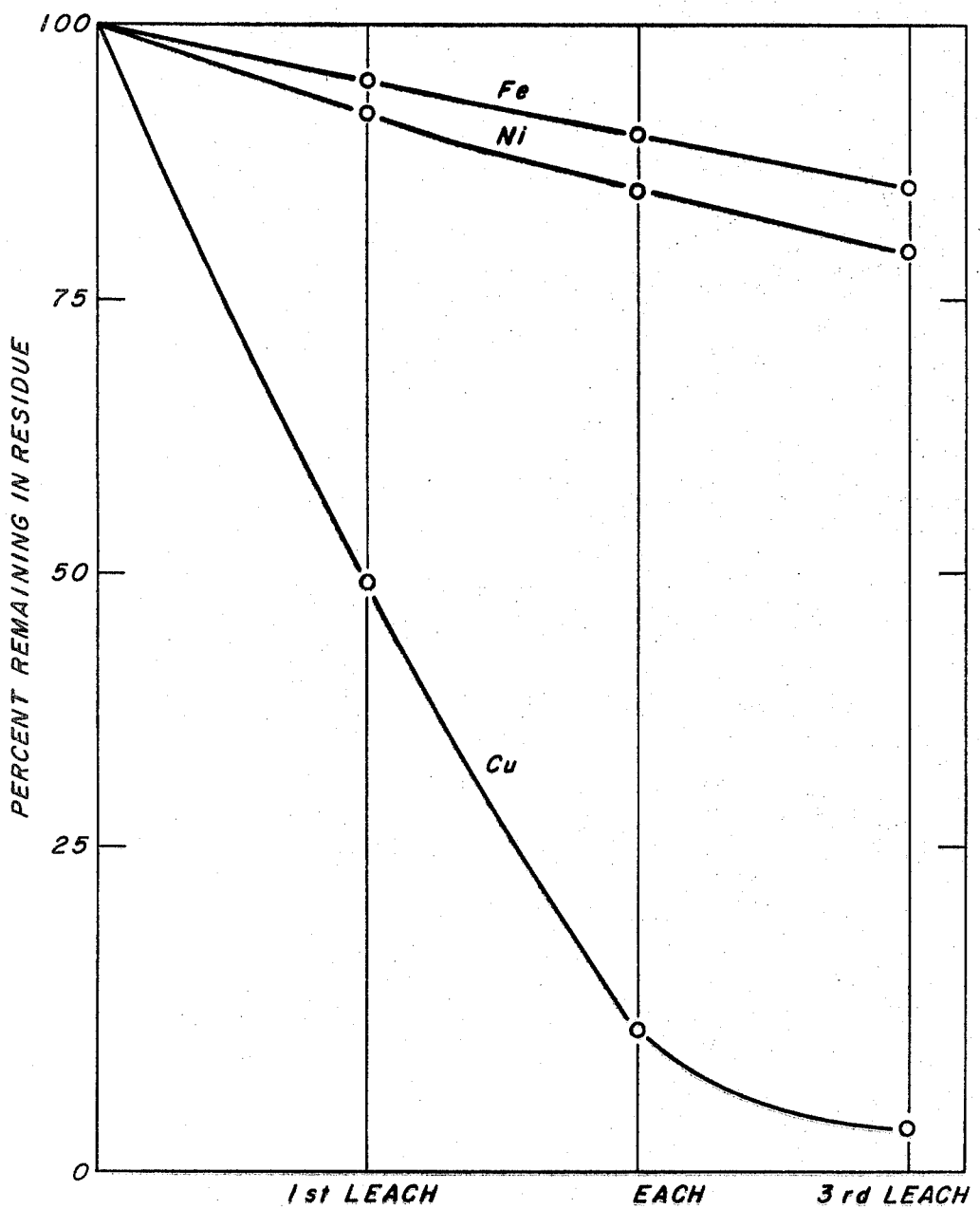

FIG. 4 is a graph showing the concentration of copper, iron and nickel as sulfates in the water leach after intermediate roasting in 90 percent air/10 percent $SO_2$ at 600°C, and the averages; and FIG. 5 is a graph showing, at each leach stage performed according to our invention after roasting in 90 percent air/10 percent $SO_2$ at 600°C, the percent iron, nickel and copper remaining in the residue.

The Duluth-Gabbro concentrate investigated was about 90 percent below 200 mesh and had the following composition:

| | | | | Weight, % | | | | | |
|---|---|---|---|---|---|---|---|---|---|
| Fe | Cu | Ni | S | CaO | MgO | $Ak_2O_3$ | $SiO_2$ | $CO_3$ | O as $Fe_3O_4$ |
| 20.5 | 13.1 | 2.1 | 17.2 | 3.5 | 6.7 | 6.6 | 24.5 | 0.7 | 2.3 |

Using 20 g samples, roasting was carried out in a fluidized bed with a stream of air or air-$SO_2$ mixtures. The gas mixture was metered through rotometers to the bottom of the reactor, passing through the ore bed and exiting at the top of the reactor. The reactor was a 20 mm bore silica tube that was necked down to a 4 mm bore inlet tube. A glass bead was used as a check ball to keep the ore from dropping out of the bed. A chromel-alumel thermocouple, sheathed in a silica tube, was positioned in the reactor so that the ore bed temperature could be monitored. A zircon refractory tube containing the reactor was housed in an electric resistance furnace. The ore bed temperature was controlled by raising or lowering the reactor to obtain and maintain the desired operating temperature.

At the beginning of an experiment the furnace temperature and gas flow was preset to the desired operating conditions and about 20 g of the concentrate was dumped into the reactor. A gas flow of 300 cc/min. was found to be best suited for the present experimental conditions, because it afforded the best temperature control with the least dust carry-over; no appreciable increase in sulfation was observed at higher gas flow rates. The best operating temperature for this particular ore was found to be within the range 580° to 620°C. At temperatures lower than 580°C, sulfation of iron increases markedly and at temperatures above 620°C, the sulfation decreases and instead of sulfate, oxide and oxy-sulfate of copper are formed.

After a sulfatizing roast for a period of 40 to 60 minutes the roast was leached in water. The leach step was conducted in a conventional manner, i.e., by passing water into and through the concentrate. The amount of water used in each leach step should be sufficient to dissolve substantially all, or at least 75 percent of the available copper sulfate, which is of course readily soluble. The leach solution was analyzed for copper and iron by a titrimetric method. A gravimetric method was used for nickel analysis. The residue from the water leach was fused with sodium carbonate and analyzed in the usual way for iron, nickel and copper. The residual sulfur in the roast was determined by $CO_2$-combustion-iodimetric method.

In a series of experiments the residue from the water leach was re-roasted in a 90 percent air-10 percent $SO_2$ mixture and after a second water leach, the residue was roasted for the third time.

Figure 1:
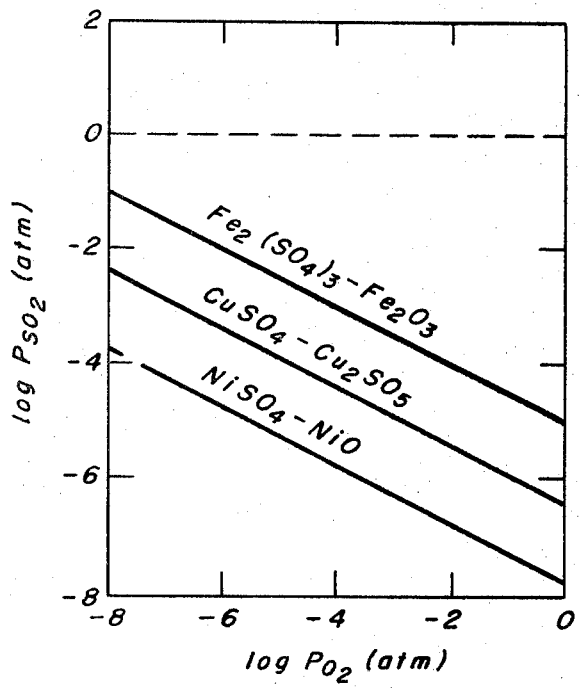
FIG. 1 is a graph showing sulfate/oxide partial pressures for stability of iron, copper and nickel at 500°C.
Figure 2:
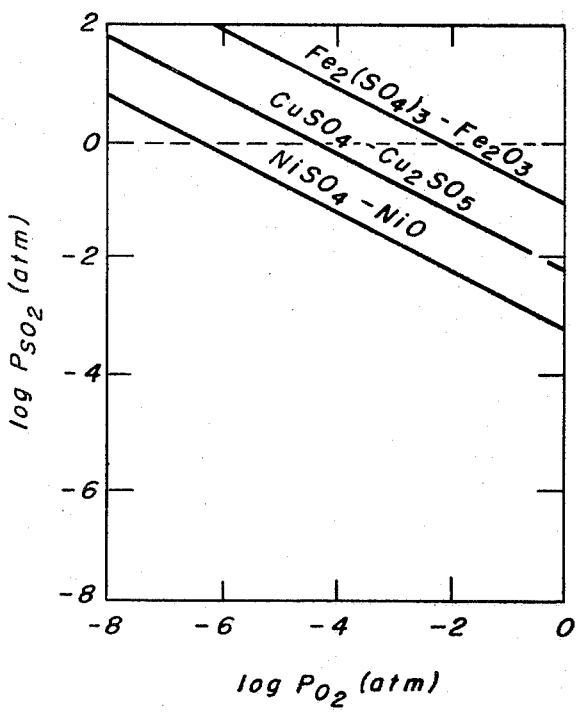
FIG. 2 is a similar graph at 700°C.
Figure 3:
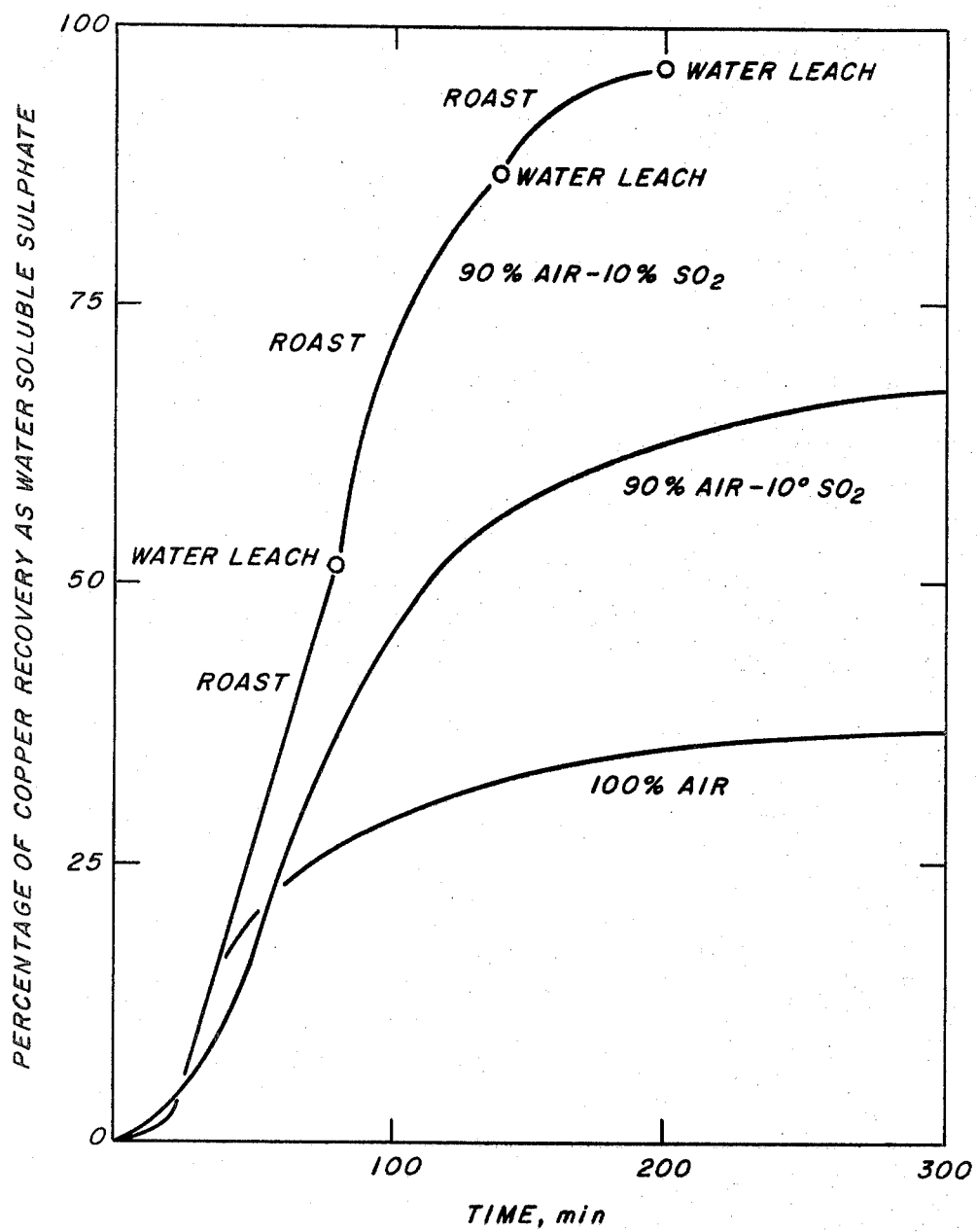
FIG. 3 is a graph showing the percentage of copper recovery as water soluble sulfate through the use of my invention.

The typical examples of experimental results are given in FIG. 3, showing the percentage of copper recovery as water soluble sulfate as a function of time of roast. The lower curve is for air roast; after roasting for 300 minutes about 35 percent of the copper was converted to copper sulfate and the residue from the water leach contained about 4 percent sulfur which presumably was essentially in the form of copper oxy-sulfate.

If roasting is carried out in a 90 percent air-10 percent $SO_2$ mixture, more copper is converted to copper sulfate, e.g., about 70 percent after 300 minutes. A number of experiments were carried out with oxygen enriched air, e.g., up to about 25 percent $O_2$ enrichment; there was no improvement in sulfation of copper. The term "air atmosphere" as used herein is intended to include such oxygen enriched air.

The major improvement in copper recovery as water soluble sulfate is achieved by re-roasting of the residue from the water leach. The top curve in FIG. 3 summarizes the results obtained by the repeated roast-leach process. After the third roast about 96 percent of the copper was recovered as copper sulfate. The intermediate water leach removes the layer of copper sulfate surrounding copper oxide particles and facilitates further sulfation during the second and third stages of roasting. In a few experiments the samples were ground finer after the first stage then re-roasted again in a 90 percent air, 10 percent $SO_2$ mixture. Such a treatment did not improve conversion to copper sulfate.

The copper, iron and nickel contents of 1st, 2nd and 3rd leach solutions, with intermediate roasts, are given in FIG. 4; concentration is relative to percent Cu plus percent Fe plus percent Ni in solution equals 100 percent. These are averages of several experiments which were found to be reproducible within about 10 percent of the average amounts. The relative proportions of the cations remain essentially unchanged in the 1st and 2nd leach solution; about 85 percent of cation content is copper, 11 percent iron and 4 percent nickel. Relatively pure copper can be recovered from this leach solution by conventional method of electrolysis. After the 3rd stage of the roast, there is a marked increase in the nickel and particularly in iron content and a corresponding decrease in the copper content of the leach solution. However, the 3rd roast does bring about a further increase in copper recovery (FIG. 3). The average cation concentrations in the mixture of 1st, 2nd and 3rd leach solutions are: 75 percent Cu, 20 percent Fe, and 5 percent Ni. Depending on the overall economics and efficiency of electrolysis for copper recovery, all the leach solutions may be mixed prior to electrolysis or the 3rd leach solution be treated separately.

Relative to the amounts present in the sulfide concentrate, percentages of iron, nickel and copper remaining in the residue from 1st, 2nd and 3rd leach operations, with intermediate roasts, are given in FIG. 5. Of the initial contents in the concentrate, about 4 percent of copper, 79 percent of nickel and 85 percent of iron remain in the final residue after the 3rd stage of roast and water leach. The average composition of the final residue is: 1.5 percent Cu, 2.2 percent Ni, 25 percent Fe, (primarily as oxides), 1 percent S and the remainder 40 percent gangue matter. This residue is amenable to further treatment for the recovery of nickel either by selective reduction or by segregation (salt-carbon) roasting.

For sulfation in air at atmospheric pressure and 600°C, the equilibrium partial pressure of $SO_2$ is: $3.63 \times 10^{-3}$ atm for $Fe_2(SO_4)_3/Fe_2O_3$, $2.24 \times 10^{-4}$ atm for $CuSO_4/Cu_2SO_5$ and $2.51 \times 10^{-5}$ atm for $NiSO_4/NiO$. In air roasting of Duluth-Gabbro concentrates the $SO_2$-pressure developed in the bed is much higher than that for the $Fe_2(SO_4)_3/Fe_2O_3$ equilibrium, yet only a small amount of ferric sulfate forms in the roast. Over a wide range of roasting conditions sulfides cannot be oxidized directly to sulfates. The sulfides are first converted to their respective oxides, and if there is sufficient $O_2$ and $SO_2$ in the bed, the oxides may then be converted to sulfates.

Because of the complexity of the system, the rate controlling reaction in sulfation cannot be resolved from the present experimental work. It is, however, an experimental finding that the rate of sulfation of copper is much improved by roasting in a 90 percent air-10 percent $SO_2$ mixture; further increase in $SO_2$-pressure or oxygen enrichment does not improve further the rate of sulfation. An intriguing feature of the present finding is the preferential sulfation of copper, although $O_2$ and $SO_2$-partial pressures in the bed are much above those for $Fe_2(SO_4)_3/Fe_2O_3$ equilibrium.

A number of residue samples from the third water leach were examined under a scanning electron microscope and searched by X-ray scanning for locations rich in iron, nickel and copper. In the water leach residue, nickel is concentrated in a few isolated grains together with iron; Ni/Fe ratio being higher in the core of the grains; grains rich in copper do not contain much nickel. Although the water leach residue contains about 1 percent S, no sulfur peak is observed on the X-ray spectrum, suggesting that nickel remaining in the residue is not in a sulfate form. Presumably this residual sulfur is in the form of pyrrhotite which is finely dispersed in grains rich in iron.

The sulfatizing roasting characteristics of Duluth-Gabbro concentrates are contrary to those anticipated from thermodynamic considerations. If sulfatizing roasting were controlled by equilibrium conditions in the bed, the iron, and most of copper and nickel would have been converted to their respective sulfates which are water soluble. However, the operation of my invention on this particular sulfide deposit is such that preferential sulfation of copper is achieved readily. According to the present results of bench scale experiments, using a fluidized bed, over 95 percent of the copper can be converted to copper sulfate by three consecutive stages of roast in 90 percent air-10 percent $SO_2$ and water leach.

The average cation concentrations in the mixture of 1st, 2nd and 3rd leach solutions are: 75 percent copper, 20 percent iron and 5 percent nickel; 1st and 2nd leach solutions are much richer in copper, 85 percent copper, 11 percent iron and 4 percent nickel. Relatively pure copper can be recovered from this leach solution by conventional methods of electrolysis, with sulfuric acid as a by-product.

Of the initial contents in the concentrate, about 4 percent of copper, 79 percent of nickel and 85 percent of iron remain in the final residue after the third stage of roast and water leach. The average composition of the final residue is: 1.5 percent copper, 2.2 percent nickel, 25 percent iron (primarily as oxides), 1 percent sulfur and the remainder 40 percent gangue matter.

Persons skilled in the art of the treatment of copper ores will recognize that our method enables the ready separation of copper from nickel. This is particularly beneficial for the treatment of ores containing significant amounts of copper sulfide, iron-nickel sulfide, and pyrite.

Our method is beneficial in the treatment of ore concentrates having about 8–20 percent copper, 12–25 percent iron (which may be present as FeS and/or as oxides) 1–5 percent nickel, up to 2 percent total cobalt, chromium and zinc, and about 8–20 percent sulfur. The copper to nickel ratio will be in the range of 3:1 to 8:1. Generally the copper and nickel content in the original ore totals about 1 percent. Typically there will be more FeS than iron oxides. The concentrate described above is made from copper ore in a conventional manner such as by floatation.

Not only is the nickel efficiently separated from the copper in our process, but the iron contained in the leach solution is considerably lower than that obtainable by conventional methods. Low iron content is advantageous in the leach solution because iron substantially affects the efficiency of conventional electrolytic methods of separation of copper from the leach solution.

In the following Table I, the results of several roast-leach experiments are shown. Concentrates A and B had the following compositions:

| Batch | Fe | Cu | Ni | S | CaO | MgO | $Al_2O_3$ | $SiO_2$ |
|---|---|---|---|---|---|---|---|---|
| | | | | Weight % | | | | |
| A | 14.84 | 8.18 | 1.13 | 9.8 | 4.9 | 8.5 | 9.4 | 33.2 |
| B | 20.87 | 13.31 | 1.99 | 16.4 | 3.5 | 6.7 | 6.6 | 24.5 |

TABLE I

Sulfatizing Roasting of Duluth-Gabbro Concentrate in a 90% Air-10% $SO_2$ Mixture. Percentage of Metal Extracted by Water Leach as Soluble Sulfates

| Batch | Run No. | Roast-Leach Stages | Temp. °C | Time Min. | %Cu (by stage) | %Cu (Total) | %Fe (by stage) | %Fe (Total) | %Ni (by stage) | %Ni (Total) |
|---|---|---|---|---|---|---|---|---|---|---|
| B | 1 | 1 | 625 | 60 | 28.9 | 28.9 | 3.0 | 3.0 | — | — |
| B | 2 | 1 | 605 | 120 | 49.5 | 49.5 | 5.9 | 5.9 | — | — |
| B | 3 | 1 | 605 | 300 | 68.1 | 68.1 | 6.7 | 6.7 | — | — |
| A | 4 | 1 | 605 | 80 | 36.7 | 36.7 | 3.9 | 3.9 | — | — |
| | | 2 | 605 | 20 | 25.8 | 62.5 | 1.3 | 5.2 | — | — |
| B | 5 | 1 | 620 | 80 | 50.4 | 50.4 | 7.4 | 7.4 | — | — |
| | | 2 | 625 | 80 | 15.6 | 66.0 | 4.4 | 11.8 | — | — |
| B | 6 | 1 | 605 | 160 | 65.2 | 65.2 | 5.1 | 5.1 | — | — |
| | | 2 | 605 | 60 | 25.6 | 90.8 | 1.8 | 6.9 | — | — |
| A | 7 | 1 | 605 | 80 | 43.4 | 43.4 | 5.0 | 5.0 | — | — |
| | | 2 | 605 | 10 | 14.9 | 58.3 | 3.0 | 8.0 | — | — |
| | | 3 | 605 | 10 | 15.4 | 73.7 | 2.2 | 10.2 | — | — |
| A | 8 | 1 | 605 | 80 | 43.6 | 43.6 | 5.5 | 5.5 | 15.8 | 15.8 |
| | | 2 | 605 | 40 | 40.1 | 83.7 | 3.2 | 8.7 | 12.3 | 28.1 |
| | | 3 | 580 | 40 | 10.4 | 94.1 | 4.5 | 13.2 | 7.2 | 35.3 |
| A | 9 | 1 | 605 | 80 | 36.2 | 36.2 | 7.7 | 7.7 | — | — |
| | | 2 | 605 | 50 | 43.6 | 79.8 | 4.0 | 11.7 | — | — |
| | | 3 | 605 | 60 | 12.5 | 92.3 | 4.3 | 16.0 | — | — |
| B | 10 | 1 | 650 | 40 | 45.0 | 45.0 | 9.2 | 9.2 | 12.8 | 12.8 |
| | | 2 | 605 | 60 | 34.4 | 79.4 | 1.2 | 10.4 | 10.1 | 22.9 |
| | | 3 | 605 | 60 | 15.0 | 94.4 | 2.1 | 12.5 | 7.4 | 30.1 |
| B | 11 | 1 | 605 | 80 | 39.6 | 39.6 | 3.8 | 3.8 | — | — |
| | | 2 | 605 | 80 | 40.8 | 80.4 | 3.9 | 7.7 | — | — |
| | | 3 | 605 | 60 | 13.4 | 93.8 | 3.5 | 11.2 | — | — |
| B | 12 | 1 | 600 | 80 | 41.6 | 41.6 | 4.6 | 4.6 | 8.6 | 8.6 |
| | | 2 | 600 | 60 | 35.1 | 76.7 | 3.9 | 8.5 | 5.9 | 14.5 |
| | | 3 | 600 | 60 | 13.2 | 89.9 | 6.7 | 15.2 | 6.4 | 20.9 |

We do not intend to be restricted to the particular illustrations and examples recited above. Our invention may be otherwise variously practiced within the scope of the following claims.

We claim:

1. Method of removing copper from sulfide ore concentrate comprising roasting said concentrate in an air atmosphere including about 5 percent to 15 percent $SO_2$ at a temperature of 600°–625°C for at least 60 minutes, leaching the concentrate with water, collecting the leach solution, and repeating the roasting and leaching steps at least once more.

2. Method of claim 1 in which the ore concentrate contains from about 8–20 percent copper, 12–25 percent iron, 1–5 percent nickel and up to 2 percent total cobalt, chromium and zinc.

3. Method of claim 1 in which the ratio of copper to nickel in the concentrate is in the range of from about 3:1 to about 8:1.

4. Method of claim 1 in which the roasting and leaching steps are each performed three times.

5. Method of sulfating copper in a copper ore concentrate containing 8–20 percent copper, 12–25 percent iron, 1–5 percent nickel and up to 2 percent total cobalt, chromium and zinc comprising roasting said concentrate at a temperature of 600°C to 625°C in air containing 5–15 percent $SO_2$.

6. Method of claim 1 in which the sulfide ore concentrate is in a fluidized bed during the roasting step.

7. Method of claim 1 in which the temperature is in the range of 600°–625°C.

8. Method of claim 1 in which the roasting step lasts for 60 minutes.

* * * * *